United States Patent
Yasrebi et al.

(10) Patent No.: US 8,743,688 B2
(45) Date of Patent: Jun. 3, 2014

(54) METHOD AND APPARATUS FOR DYNAMICALLY CONTROLLING INTERNET PROTOCOL PACKET HANDLING IN A VOICE OVER INTERNET PROTOCOL NETWORK

(75) Inventors: Mehrad Yasrebi, Austin, TX (US);
James Jackson, Austin, TX (US);
Chaoxin Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 403 days.

(21) Appl. No.: 12/635,863

(22) Filed: Dec. 11, 2009

(65) Prior Publication Data

US 2011/0141920 A1 Jun. 16, 2011

(51) Int. Cl.
*H04L 12/26* (2006.01)

(52) U.S. Cl.
USPC .................. 370/235; 370/328; 709/225

(58) Field of Classification Search
USPC ......... 370/229–235, 310, 328, 338, 389, 392, 370/398, 399, 409, 422; 709/225, 226, 709/232–234, 244, 243; 726/2–21
See application file for complete search history.

(56) References Cited

U.S. PATENT DOCUMENTS

| | | | | |
|---|---|---|---|---|
| 6,219,706 | B1* | 4/2001 | Fan et al. | 709/225 |
| 6,463,474 | B1* | 10/2002 | Fuh et al. | 709/225 |
| 6,651,096 | B1* | 11/2003 | Gai et al. | 709/225 |
| 6,732,177 | B1* | 5/2004 | Roy | 709/226 |
| 7,376,084 | B2* | 5/2008 | Raghunath et al. | 370/233 |
| 7,756,022 | B1* | 7/2010 | Cook | 370/229 |
| 8,125,999 | B2 | 2/2012 | Yasrebi | |
| 8,130,663 | B2 | 3/2012 | Jackson | |
| 2003/0021252 | A1* | 1/2003 | Harper et al. | 370/338 |
| 2003/0105863 | A1* | 6/2003 | Hegli et al. | 709/225 |
| 2003/0169712 | A1* | 9/2003 | Tsao | 370/338 |
| 2004/0008707 | A1* | 1/2004 | Nakamichi et al. | 370/389 |
| 2004/0151135 | A1* | 8/2004 | Kitahama et al. | 370/328 |
| 2005/0070283 | A1* | 3/2005 | Hashimoto et al. | 455/435.1 |
| 2006/0126580 | A1* | 6/2006 | Katsumata et al. | 370/338 |
| 2007/0209061 | A1* | 9/2007 | Dekeyzer et al. | 726/3 |
| 2008/0232247 | A1* | 9/2008 | Evans et al. | 370/235 |
| 2009/0225746 | A1 | 9/2009 | Jackson | |
| 2009/0293123 | A1 | 11/2009 | Jackson | |
| 2009/0296566 | A1 | 12/2009 | Yasrebl | |
| 2009/0303875 | A1* | 12/2009 | Matsumura | 370/230 |
| 2010/0027529 | A1 | 2/2010 | Jackson | |
| 2010/0208653 | A1* | 8/2010 | Morinaga et al. | 370/328 |
| 2011/0082919 | A1 | 4/2011 | Qiu | |
| 2011/0090900 | A1 | 4/2011 | Jackson | |
| 2011/0093584 | A1 | 4/2011 | Qiu | |

* cited by examiner

*Primary Examiner* — Jeffrey M Rutkowski

(57) ABSTRACT

In one embodiment, the present disclosure is a method and apparatus for dynamically controlling Internet Protocol packet flows in a Voice over Internet Protocol network. In one embodiment, a method for controlling flows of packets in a network includes obtaining a list identifying at least one user element that is authorized to register with the network and dynamically configuring a manner in which at least one border element handles the packets in accordance with the list.

15 Claims, 4 Drawing Sheets

METHOD AND APPARATUS FOR DYNAMICALLY CONTROLLING INTERNET PROTOCOL PACKET HANDLING IN A VOICE OVER INTERNET PROTOCOL NETWORK

FIELD OF THE DISCLOSURE

The present disclosure relates generally to Voice over Internet Protocol (VoIP) technology and relates more particularly to methods for controlling access by VoIP endpoint devices to VoIP networks.

BACKGROUND

After recovery from a catastrophic failure (e.g., a wide-scale power outage), a VoIP network can easily become overloaded when many or all of its endpoints attempt to re-register with the network in a short window of time. For example, in a session initiation protocol (SIP)—based environment, many of the endpoints may issue SIP REGISTER messages within a small window of time. The overload on the network will cause a large percentage of these SIP REGISTER messages to fail with a SIP error or a timeout.

An endpoint that receives a SIP error or a timeout may attempt to re-transmit the SIP REGISTER message. This re-transmission process is controlled by a timer in the endpoint. However, the timers in all of the endpoints are typically set to the same value, such that the endpoints are likely to attempt re-transmission within the same small window of time. As such, the pattern of globally synchronized registration attempts and failures can continue.

To further complicate matters, the VoIP infrastructure may become so overwhelmed that even calls from registered endpoints may fail. These failed calls may in turn cause more endpoints to attempt re-registration, thereby exacerbating the ongoing registration flood. This snowballing effect can ultimately lead to a major failure of the VoIP network.

SUMMARY

In one embodiment, the present disclosure is a method and apparatus for dynamically controlling Internet Protocol packet flows in a Voice over Internet Protocol network. In one embodiment, a method for controlling IP packet flows in a network includes obtaining a list identifying at least one user element that is authorized to register with the network and dynamically configuring a manner in which at least one border element handles the packets in accordance with the list.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for dynamically controlling IP packet flows in a VoIP network. Knowledge of network conditions is used to gracefully control packet flows from user element devices in VoIP endpoints, so as to protect service provider core elements and border elements. Embodiments of the disclosure utilize existing VoIP customer data to dynamically prioritize and control the packet flows and to modify the behavior of border elements. The terms "user element" and "endpoint device" are used synonymously in the following discussion.

Figure 1:
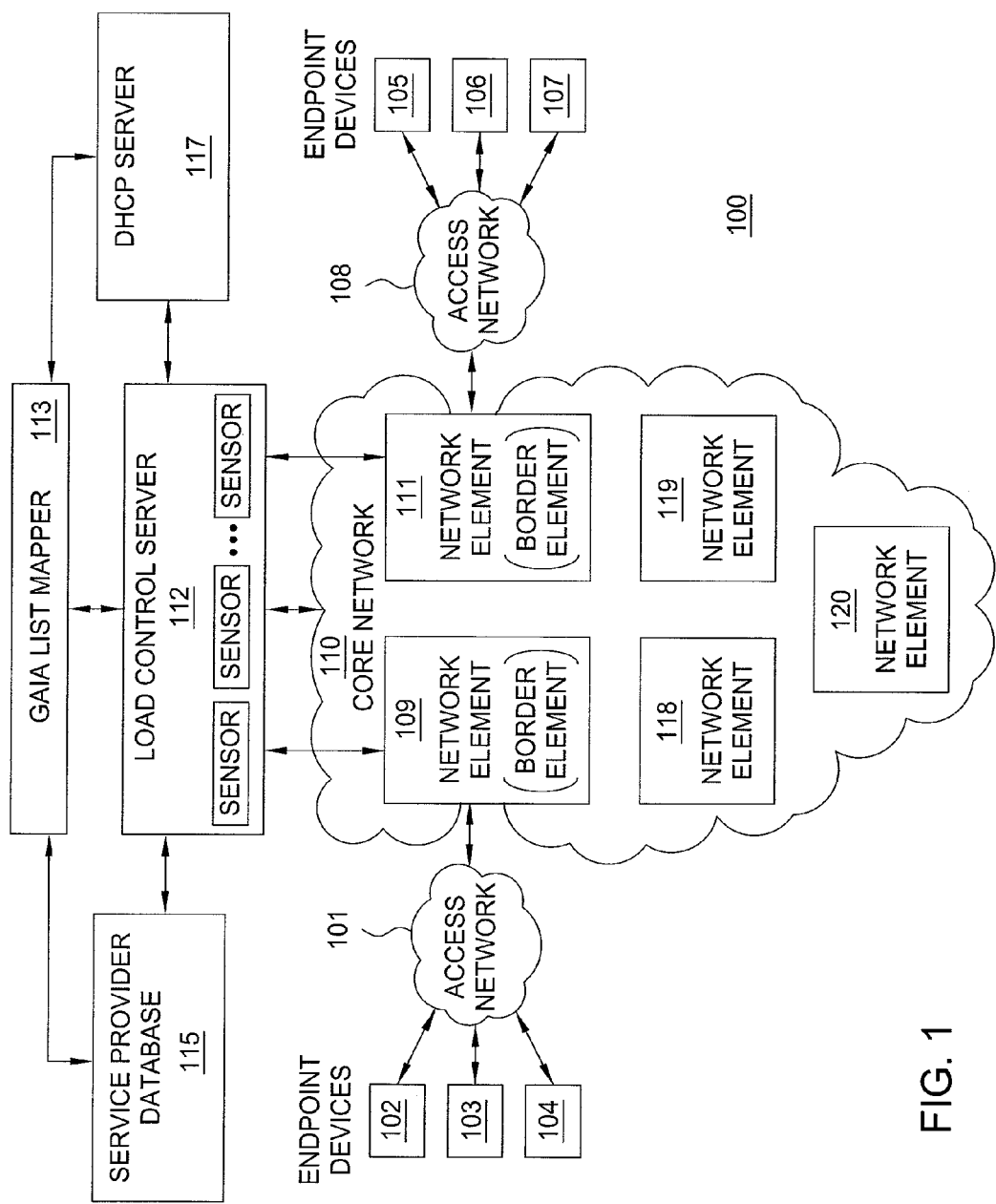
FIG. 1 is a schematic diagram illustrating an exemplary network within which an embodiment of the present disclosure is deployed.

FIG. 1 is a schematic diagram illustrating an exemplary network 100 (e.g., an Internet Protocol (IP) Multimedia Subsystem network) within which an embodiment of the present disclosure is deployed. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 comprises a plurality of endpoint devices 102-104 configured for communication with the core network 110 (e.g., an IP-based core backbone network supported by a service provider) via an access network 101. Similarly, another plurality of endpoint devices 105-107 are configured for communication with the core network 110 via another access network 108. The network elements 109 and 111 may serve as gateway servers or edge routers for the core network 110.

The endpoint devices 102-107 may comprise customer endpoint devices such as personal computers, laptop computers, personal digital assistants (PDAs), mobile phones, smart phones, gaming consoles, or the like. The access networks 101 and 108 serve as conduits to establish connections between the endpoint devices 102-107 and the network elements (NEs) 109 and 111 of the core network 110. The access networks 101 and 108 may each comprise a Digital Subscriber Line (DSL) network, a broadband cable access network, a Local Area Network (LAN), a Wireless Access Network (WAN), a third-party network, or the like. The access networks 101 and 108 may be directly connected to the NEs 109 and 111 of the core network 110, or may be indirectly connected to the NEs 109 and 11 through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a proxy server, a border element, a firewall, a switch, and/or the like. In one embodiment, the NEs 109 and 111 are implemented as border elements that are the first application level contact point of at least some of the endpoint devices 102-107 with the core network 110. An NE may also reside within the core network 110 (e.g., NEs 118-120) and may be used as a SIP server, a core router, or like device.

The network 100 also comprises at least one load control server 112. As discussed in further detail below, the load control server 112 operates to control access by the endpoint devices 102-107 to the core network 110. The load control server 112 communicates with the core network 110 and the components thereof (e.g., NEs 109 and 111) in order to directly monitor and record the conditions (health, load, etc.)

of the core network 110 and its components. To this end, the load control server 112 may include one or more monitoring applications that monitor the workload and health of the network. In one embodiment, the load control server 112 is further configured to track the number of endpoint devices whose registrations have expired from the core network 110 over a window of time. This helps the load control server 112 to detect catastrophic failures.

The network 100 further comprises an optional global authorized IP addresses (GAIA) list mapper 113 coupled to the load control server 112. As discussed in further detail below, the GAIA list mapper maintains a list of the IP addresses of devices that are to be allowed to register with the core network 110. To this end, the GAIA list mapper 113 can be further coupled to a service provider customer database 115, which stores information about devices with static IP addresses, and an enhanced dynamic host configuration protocol (DHCP) server 117, which stores information about devices with dynamic IP addresses. The GAZA list mapper 113 may also create a mapping of these IP addresses to candidate primary and backup border elements 109 and 111. In an alternative configuration, the load control server 112 may perform the functions of the GAIA list mapper 113. In this case, the service provider customer database 115 and the DHCP server 117 are coupled directly to the load control server 112.

The network 100 is described only to provide an illustrative environment in which packets for voice, data, and multimedia services are transmitted on IP Multimedia Subsystem (IMS) networks. The present disclosure is not limited to use with the illustrated configuration. For example, for ease of illustration, only a limited number of endpoint devices, network elements, access networks, load distribution servers, and the like have been depicted in FIG. 1. However, those skilled in the art will appreciate that embodiments of the present disclosure are highly scalable and may be implemented within networks including any number of these components. The components and elements described herein can be combined and rearranged in various ways without limiting the scope or the intent of the present disclosure.

Figure 2:
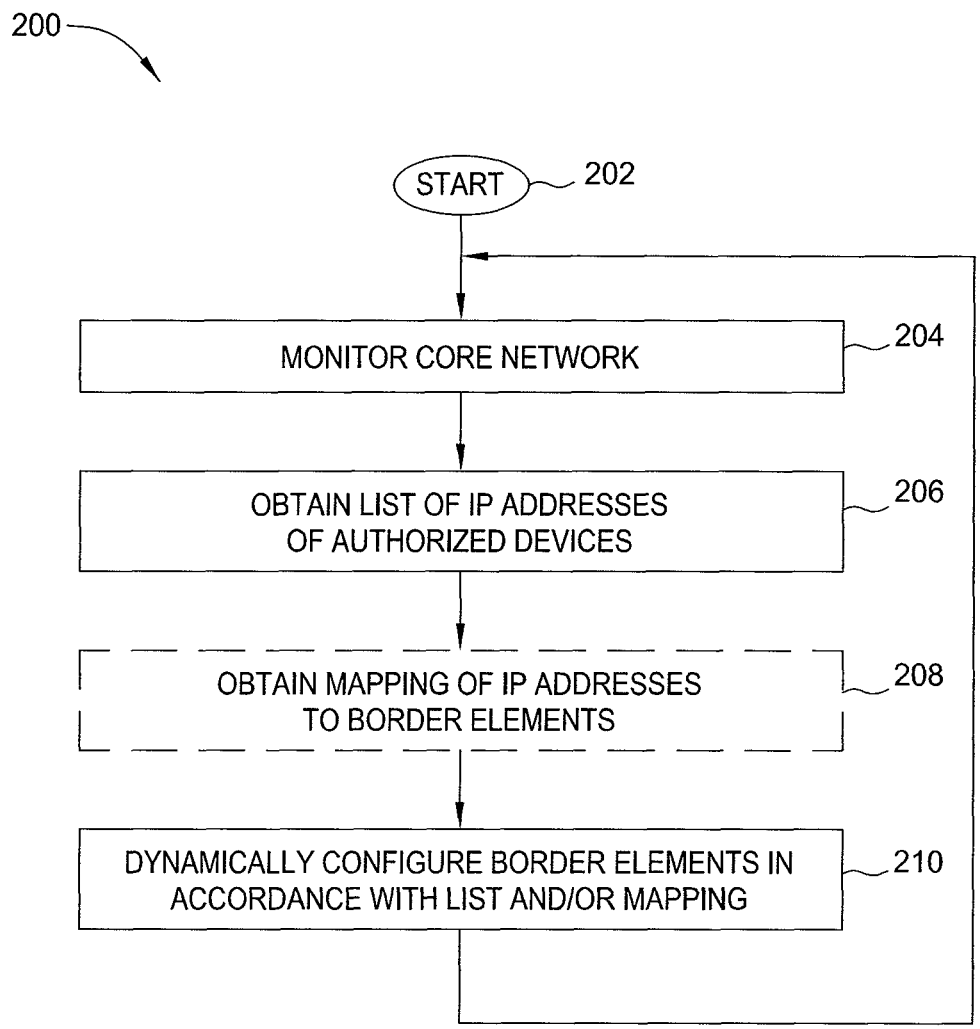
FIG. 2 is a flow diagram illustrating a first embodiment of a method for dynamically controlling IP packet flows in a VoIP network, according to the present disclosure.

FIG. 2 is a flow diagram illustrating a first embodiment of a method 200 for dynamically controlling IP packet flows in a VoIP network, according to the present disclosure. The method 200 may be implemented, for example at the load control server 112 illustrated in FIG. 1. As such, reference is made in the discussion of FIG. 2 to various elements of the network 100. It will be appreciated, however, that the method 200 is not limited to operation within the network illustrated in FIG. 1. The method 200 may, in fact, be applied within networks having alternative configurations.

The method 200 is initialized at step 202 and proceeds to step 204, where the load control server 112 monitors the core network 110. In one embodiment, the load control server 112 monitors various aspects of the core network 110 and/or its components, such as the general health, load, or other parameters. In one embodiment, the load control server 112 monitors the capacity of each border element 109 and 111. More specifically, the load control server 112 may monitor the capacity of a border element as a function of the border element's current load (e.g., measured in transactions and/or registrations per second), number of configured user elements, or rate of endpoint loss.

In step 206, the load control server 112 obtains a list of the IP addresses of devices (e.g., user elements in the endpoint devices 102-107) that are to be allowed to register with the core network 110. These IP addresses may be static or dynamic, as discussed above. In the event that the load control server 112 incorporates the GAIA list mapper 113 (e.g., as an integral component), the list is generated by the load control server 112, using data provided by the service provider customer database 115 and/or the DHCP server 117. In the event that the load control server 112 and the GAIA list mapper 113 comprise distinct components, the list is generated by the GAIA list mapper 113, which provides the list to the load control server 112. In one embodiment, receiving or generating the list comprises updating an existing list. In another embodiment, the GAIA list mapper 113 can obtain the list of IP addresses of all user endpoint devices 102-107 directly from the network border elements 109 and 111 when the user elements are registered via the border elements 109 and 111. The border elements 109 and 111 can typically extract and store the IP addresses of the registered user elements from the Contact header of the user elements' register messages.

In optional step 208 (illustrated in phantom), the load control server 112 obtains a mapping of the IP addresses in the list to candidate primary and backup border elements 109 and 111. That is, for at least one IP address in the list, the mapping identifies at least one candidate primary border element and at least one candidate backup border element. Thus, the mapping may identify a list of user element IP addresses that may be assigned to each border element 109 and 111. In a further embodiment, the mapping identifies the media access control (MAC) addresses of the user elements. In the event that the load control server 112 incorporates the GAIA list mapper 113 (e.g., as an integral component), the mapping can be generated by the load control server, using data provided by the service provider customer database 115 and/or the DHCP server 117 and/or the border elements 109 and 111. In the event that the load control server 112 and the GAIA list mapper 113 comprise distinct components, the mapping is generated by the GAIA list mapper 113, which provides the mapping to the load control server 112.

In step 210, the load control server 112 dynamically configures the border elements 109 and 111 in accordance with the list and/or the mapping and the monitored data. In one embodiment, the load control server 112 configures the border elements 109 and 111 by sending instructions to packet flows control module (e.g., element 405 of FIG. 4, discussed in greater detail below and also referred to as an IP tables manager module) at each border element 109 and 111. Variations of the IP tables technology (also referred to as IP Chains technology) can be used by the lower level networking components of some modern operating systems to keep IP packets from being received by the applications (e.g., border element applications) that use the operating systems. The IP tables manager module can then dynamically configure the underlying networking component at the corresponding border element 109 and 111 based on these instructions and using the IP tables or similar technology. In one embodiment, the instructions configure each border element 109 and 111 such that the border element only admits packets from authorized user elements (i.e., user elements listed on the list or mapping generated or received in steps 204 and 206) as well as other authorized components (e.g., the load control server 112 and network element 118 and 119). In one embodiment, the operating system networking functions (OSNF) modules of the border elements 109 and 111 are configured to accept packets only from authorized user elements and other authorized components but to ignore or drop all other packets. The OSNF modules of the border elements 109 and 111 are parts of the packet flows control function 405 that is illustrated and discussed in greater detail in FIG. 4.

In a further embodiment, the load control server 112 additionally considers customer (user) priority data when dynamically configuring the border elements 109 and 111 to admit user elements. In one embodiment, this customer priority data can be extracted from the service provider customer database 115. In another embodiment, the customer priority data may be provided along with the IP addresses and/or is correlated to the IP addresses using the corresponding MAC address.

The method 200 then returns to step 204, and the load control server 112 continues to monitor the core network 110 as discussed above. Thus, the load control server 112 may iteratively expand the list of user elements that are admissible to one or more border elements, based on various network conditions.

The method 200 therefore substantially reduces the occurrence of registration floods following catastrophic failures of a VoIP network. Moreover, the method 200 does not require modification to the components of the core network, and may be implemented with little modification to the border elements (e.g., only for the purposes of configuring the OSNF modules). Thus, the underlying operating system technology can be used to implement the method 200.

Figure 3:
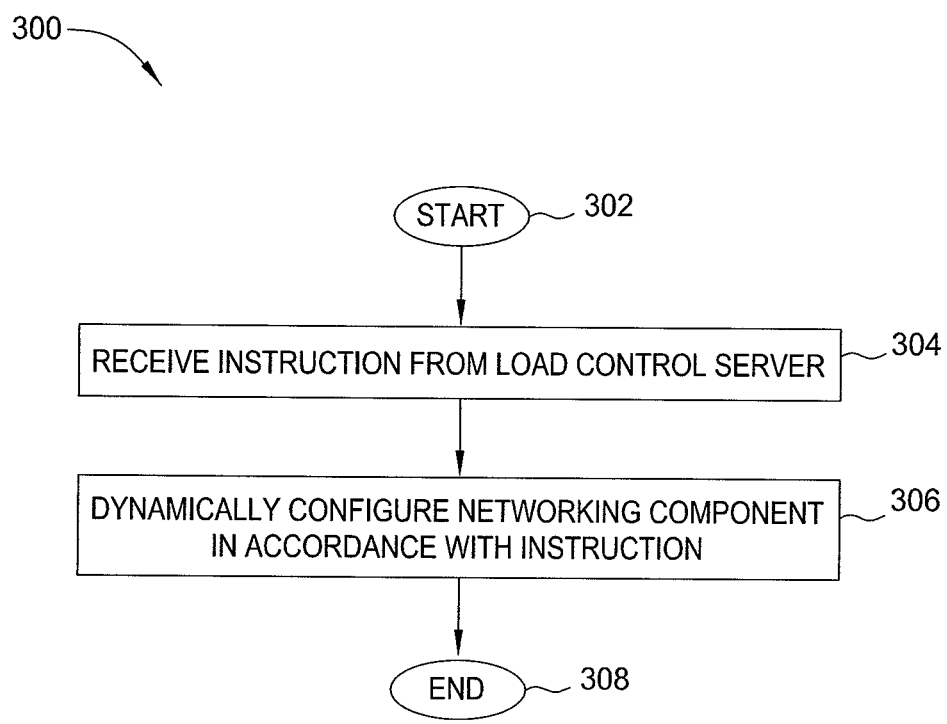
FIG. 3 is a flow diagram illustrating a second embodiment of a method for dynamically controlling IP packet flows in a VoIP network, according to the present disclosure.

FIG. 3 is a flow diagram illustrating a second embodiment of a method 300 for dynamically controlling IP packet flows in a VoIP network, according to the present disclosure. The method 300 may be implemented, for example at the border elements 109 and 111 illustrated in FIG. 1. As such, reference is made in the discussion of FIG. 3 to various elements of the network 100. It will be appreciated, however, that the method 300 is not limited to operation within the network illustrated in FIG. 1. The method 300 may, in fact, be applied within networks having alternative configurations.

The method 300 is initialized at step 302 and proceeds to step 304, where the border element 109 or 111 receives instructions from the load control server 112. In one embodiment, the instructions are received by the packet flows control module 405 (IP tables manager module) of the border element 109 or 111.

In step 306, the border element 109 or 111 dynamically configures its networking component in accordance with the instructions. In one embodiment, the instructions configure the border element 109 or 111 such that the border element 109 or 111 only admits packets from authorized user elements (i.e., user elements listed on the mapping generated or received by the load control server 112) as well as other authorized components (not endpoint devices). In one embodiment, the border element OSNF module on the user element interface is configured in accordance with the instructions to accept packets only from authorized user elements and to ignore or drop all other undesirable packets.

The method 300 then terminates in step 308.

Figure 4:
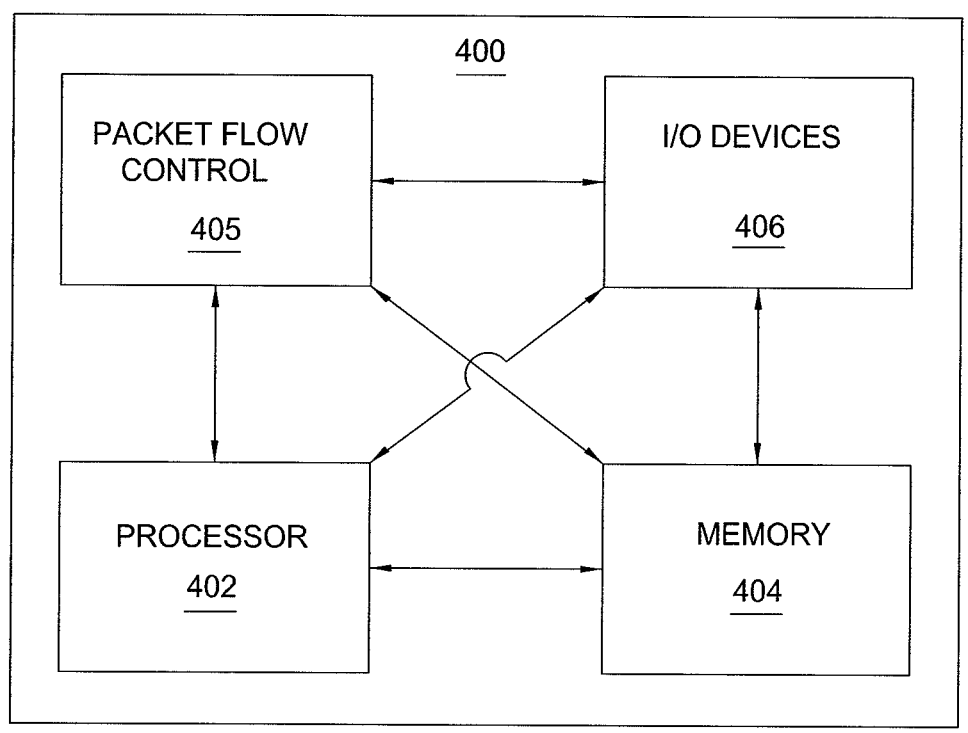
FIG. 4 is a high level block diagram of the border element assignment method that is implemented using a general purpose computing device.

FIG. 4 is a high level block diagram of the border element 109 or 111 that is implemented using a general purpose computing device 400. In one embodiment, a general purpose computing device 400 comprises a processor 402, a memory 404, a packet flows control module 405 and various input/output (I/O) devices 406 such as a display, a keyboard, a mouse, a modem, a stylus, a joystick, a keypad, controller, one or more network interfaces, a sensor, and the like. In one embodiment, at least one I/O device is a storage device (e.g., a disk drive, an optical disk drive, a floppy disk drive).

Alternatively, the packet flows control module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the packet flows control module 405 for dynamically controlling IP packet flows in a VoIP network described herein with reference to the preceding Figures can be stored on a computer readable storage medium (e.g., RAM, magnetic or optical drive or diskette, and the like).

The packet flows control module 405 (IP tables manager) can be configured and used to control admissions of packets from one or more networking interfaces (I/O devices 406) into border elements 109 and 111. The packet flows control module 405 (IP tables manager) can be used for managing communications with endpoint devices 102-107 as well as other components, and may manage one or more physical network interfaces (I/O devices 406).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for controlling a flow of packets in a network, the method comprising:
    obtaining, by a load control server, a list of a plurality of user elements identifying a user element on the list that is authorized to register with the network;
    obtaining, by the load control server, a mapping of the plurality of user elements to a plurality of border elements;
    monitoring, by the load control server, a network condition comprising a load condition in the network; and
    providing, by the load control server, an instruction for configuring one of the border elements to handle the packets in accordance with the list, the mapping and the network condition, wherein the load control server is external to the one border element, wherein the instruction configures the one border element to deny a registration message from the user element, wherein the user element is not mapped to the one border element.

2. The method of claim 1, further comprising:
    performing the configuring in accordance with the mapping, wherein the mapping maps the user element to a primary border element.

3. The method of claim 2, wherein the mapping further maps the user element to a backup border element.

4. The method of claim 1, wherein the list identifies an internet protocol address of the user element.

5. The method of claim 1, wherein the list identifies a media access control address of the user element.

6. The method of claim 1, wherein the instruction is for configuring an underlying networking component of the one border element where the one border element only admits those of the packets that are from user elements that are on the list and that are mapped to the one border element, and other non-user element authorized components.

7. The method of claim 6, wherein the instruction is further for configuring the underlying networking component where the one border element drops those of the packets that are not from the user elements that are on the list and that are mapped to the one border element, or are not from other non-user element authorized components.

8. A non-transitory computer readable storage medium storing a plurality of instructions which, when executed by a processor of a load control server, cause the processor to perform operations, the operations comprising:
   obtaining a list of a plurality of user elements identifying a user element on the list that is authorized to register with a network;
   obtaining a mapping of the plurality of user elements to a plurality of border elements;
   monitoring a network condition comprising a load condition in the network; and
   providing an instruction for configuring one of the border elements to handle packets in accordance with the list, the mapping and the network condition, wherein the load control server is external to the one border element, wherein the instruction configures the one border element to deny a registration message from the user element, wherein the user element is not mapped to the one border element.

9. The non-transitory computer readable storage medium of claim 8, further comprising:
   performing the configuring in accordance with the mapping, wherein the mapping maps the user element to a primary border element.

10. The non-transitory computer readable storage medium of claim 9, wherein the mapping further maps the user element to a backup border element.

11. The non-transitory computer readable storage medium of claim 8, wherein the list identifies an internet protocol address of the user element.

12. The non-transitory computer readable storage medium of claim 8, wherein the instruction configures an underlying networking component of the one border element where the one border element only admits those of the packets that are from user elements that are on the list and that are mapped to the one border element, and other non-user element authorized components.

13. The non-transitory computer readable storage medium of claim 12, wherein the instruction further configures the underlying networking component where the one border element drops those of the packets that are not from the user elements that are on the list and that are mapped to the one border element, or are not from other non-user element authorized components.

14. A load control server for controlling a flow of packets in a network, the load control server comprising:
   a processor; and
   a memory storing a program containing computer-readable instructions that, when executed by the processor, cause the processor to perform operations, the operations comprising:
      obtaining a list identifying a user element that is authorized to register with the network;
      obtaining a mapping of the plurality of user elements to a plurality of border elements;
      monitoring a network condition comprising a load condition in the network; and
      providing an instruction for configuring one of the border elements to handle the packets in accordance with the list, the mapping and the network condition, wherein the load control server is external to the one border element, wherein the instruction configures the one border element to deny a registration message from the user element, wherein the user element is not mapped to the one border element.

15. The load control server of claim 14, wherein the operations further comprise:
   performing the configuring in accordance with the mapping, wherein the mapping maps the user element to a primary border element.

* * * * *